Figure 1:
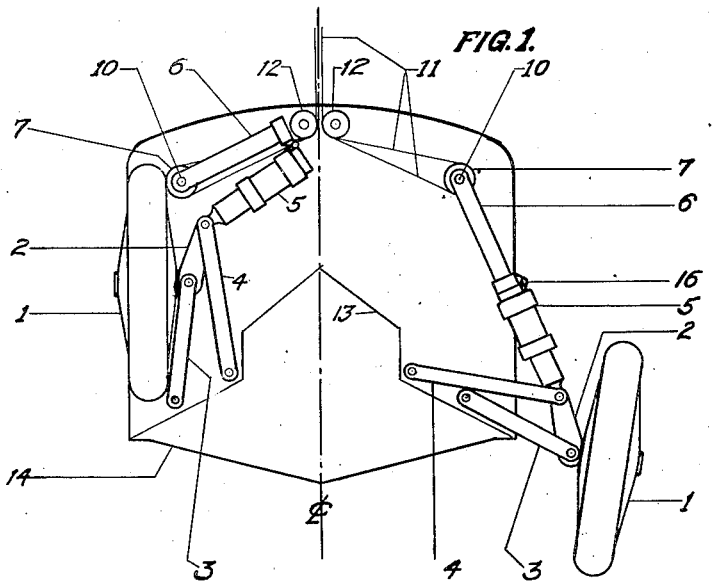

May 24, 1932. L. R. GRUMMAN 1,859,624
RETRACTABLE LANDING GEAR FOR AIRPLANES
Filed Feb. 25, 1930

WITNESS
INVENTOR
Leroy R. Grumman

Patented May 24, 1932

1,859,624

UNITED STATES PATENT OFFICE

LEROY R. GRUMMAN, OF PORT WASHINGTON, NEW YORK

RETRACTABLE LANDING GEAR FOR AIRPLANES

Application filed February 25, 1930. Serial No. 431,069.

My invention relates to airplanes but more particularly to a retractable landing gear for airplanes.

With airplanes which are designed to take off from or to alight on the ground it is necessary to provide a means of absorbing the shock incident to travelling over more or less irregular ground at the comparatively high speeds necessarily incident to the manœuvers of taking off or alighting. The earliest airplanes provided skids for this purpose and skids or skiis are still used to some extent in localities where snow or ice is prevalent. For the greater part, however, skids have been supplanted by wheeled landing gears commonly comprising two wheels mounted either on a single axle or on separate axles. Boat bodies have been provided and in some types of airplanes pontoons replace the skids with which the original flying machines were equipped, thus converting airplanes originally adapted for land use so that they may take off from or alight on water.

As the airplane developed, it was seen that a type of flying machine adapted to alight either on the sea or on land at the will of the operator would possess many advantages lacking in either the seaplane or the airplane. In order to construct a plane capable of such amphibian use it was necessary to device a boat body with wheels. A plane so equipped would be able to leave the ground and alight on the water but the drag of the wheels in the water would make alighting a rough manœuver and would effectually prevent the plane from leaving the water again except by running up on a beach or platform. In order to eliminate the drag of the wheels it was necessary to construct the wheeled landing gear so that it might be folded up out of the way when the airplane was about to alight on or take off from the water. Such landing gears have been successfully constructed and are no longer new, but means of collapsing them and resetting them for purposes of alighting on the land have been somewhat complicated and in some instances unreliable.

Even on a seaplane not designed to alight on land, a retractable landing gear is of immense advantage when leaving or entering the water on a beach or runway.

With the tendency to increase the power and the speed of airplanes has come the realization of the excessive drag or flight resistance offered by the conventional landing gear in land airplanes. In order to cut down this resistance, in one instance at least, aviators engaged in a trans-Atlantic flight discarded their landing gears soon after taking to the air. In another plane designed for long distance flight the landing gear was so constructed as to fold up into a recess in the lower wing. This latter construction, while a great improvement, still possessed disadvantages, one of which was that the pocket in the wing seriously impaired its effective lift when the landing gear was in position for use.

The object of my invention is to provide a sturdy, strong, simple and efficient wheeled landing gear suitable for use either on land airplanes or amphibian airplanes which may be retracted within the hull of an amphibian airplane or within the fuselage of a land airplane while the plane is in flight and may be let down easily and positively by the pilot. More definitely, my objects are as follows:

1. To provide a landing gear which may readily be retracted or extended at the will of the pilot.

2. To provide a landing gear of sufficient compactness to be housed completely when retracted, in the body of a normal airplane.

3. To obtain an arrangement of members in a retractable landing gear such that loads incident to landing are transmitted in a direct manner to the body.

4. To obtain an arrangement of members in a retractable landing gear such that the loads incident to landing are not transmitted into the operating cables or other operating means.

5. To obtain an arrangement of members capable of withstanding not only the loads incident to landing but also the secondary loads which might be caused by the use of brakes on the landing wheels.

6. To obtain a simple and compact landing gear eliminating slide tubes, screw shafts, hydraulic cylinders and the like, which add weight without contributing to the landing gear itself,—being necessary only for purposes of retraction.

7. To provide a simple and compact landing gear which can be retracted, capable of being constructed for practically the same weight as a fixed type undercarriage, so that it may be employed in airplanes without unduly increasing the weight of the plane.

To this end I have constructed the device illustrated in the drawings and hereinafter described.

In the drawings, Figure 1 is a diagrammatic representation of a cross section of the body of an airplane in which my invention has been incorporated. Although in practice both wheels would be retracted or let down simultaneously, for the purposes of illustration I have shown the left wheel in its retracted position inside the body and the right wheel in its landing position outside the body.

Figure 2:
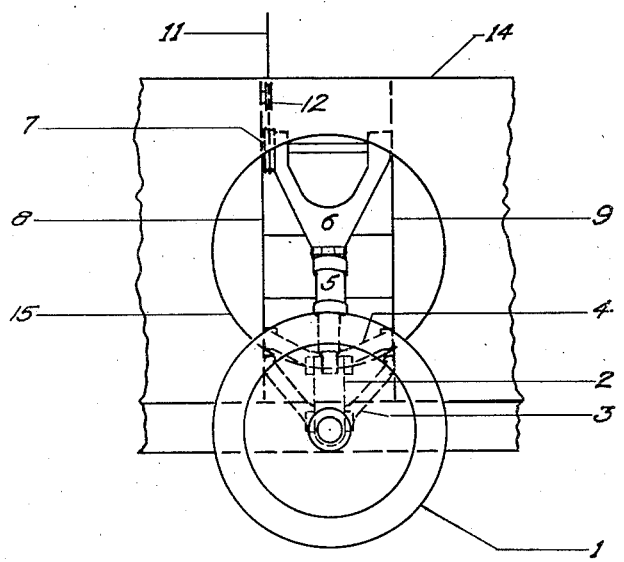

Figure 2 is a diagrammatic side view of the body at the section wherein my invention has been incorporated, showing the wheel in an intermediate position. In the drawings similar reference characters refer to similar parts throughout.

A pair of landing wheels 1 are carried on short angular axles 2 being retained thereon in any suitable manner. Each axle is joined at its upper end to the lower end of a jointed strut having a lower portion 5 and an upper portion 6. Yokes 3 and 4 are pivoted to each axle and to bulkheads, diagrammatically represented by the lines 8 and 9 of body 14. To enable the yokes to perform the double function of holding the axle in proper position when the landing gear is being raised or lowered, and of taking some of the landing shock when the plane is being brought to earth the center of yoke 4 is connected to the upper end of the angular axle 2 where it joins the strut member 5 and the center of yoke 3 is connected to the lower portion or heel of the axle; the arms of yoke 4 are pivoted to the bulk-head at points inside and above similar connections for the arms of yoke 3.

The lower portion 5 of the jointed strut may incorporate a shock absorbing member of hydraulic or other design, and it is advantageous, particularly on large airplanes, to employ such construction. The upper portion 6 of the jointed strut is connected to the lower portion by a suitable hinge 16 which permits of inward folding but which prevents outward folding after the fully extended position has been reached. To insure unidirectional folding and to provide a rigidly locked strut, at least as against shocks communicable through the wheels when in the extended position the hinge 16 is appreciably offset from the outer line of the strut members 5 and 6. Thus when the landing gear is in its landing position the members 5 and 6 form a continuous strut or column extending downwardly and outward from the body capable of withstanding the compression loads incident to landing and locked in position by the supported weight. The upper part 6 of the strut in the instance illustrated is preferably a yoke movably connected to the body bulkheads 8 and 9 in order to distribute the landing loads into the body of the airplane.

At the upper end of the strut is rigidly attached a pulley wheel or sheave 7 although a lever arm, or sprocket of suitable design would answer the purpose. Passing around this wheel in opposite directions and attached thereto at opposite sides thereof are two cables 11 which pass over a pulley 12 and thence to a suitable winding means (not shown) which may be a drum, winch, hoist, or the like either manually or power operated, located conveniently with respect to the pilot of the airplane.

Tension applied to one cable causes the landing gear to fold inwardly and tension applied to the other causes it to unfold. The means by which the folding is accomplished may be varied according to the space available in the pilot's cockpit of the airplane in which the retractable landing gear is to be installed. The system illustrated has the merits of positiveness, compactness and simplicity.

In practice the landing gear is operated by the pilot placing tension upon one or other of the cables 11. By pulling the cable which rotates the sheave 7 inwardly the upper part 6 of the jointed strut is swung inwardly the joint 16 passing downwardly and then upwardly through an arc of more than 90°. The lower part 5, of the strut follows its mate 6 and its lower end is lifted almost vertically carrying with it the angular axle 2 and the wheel 1. At no time is the strut section 5 inverted, a feature which insures the operation of the hydraulic shock absorber. The yokes 3 and 4 move about their pivots in the body with what I call a pantograph motion, thereby guiding the axle 2 and the wheel 1 through a fixed path of travel into a recess 15 in the wall of the body 14.

To extend the landing gear, tension is applied to the other cable, the sheave 7 is rotated in the opposite direction and the folding process is reversed, the various parts following the same path until they have reached their extended position where by reason of the action of the offset hinge 16 and the effect of the bracing yokes 3 and 4 the undercarriage locks itself against collapse from any force encountered in service.

Although the landing gear requires considerable housing space in the body cavity it is not necessary to sacrifice strength to provide this space. A partition 13 is indicated which represents a section not disturbed by the retracting members and through which longitudinal supporting members may be placed.

I do not desire to limit my invention to the specific structure shown by the drawings or described herein, as numerous modifications are possible without departing from the scope of the invention.

I claim:

1. In an airplane and the like, a body, an undercarriage having wheels separately mounted and folding means including a jointed strut with an offset hinge to retract the undercarriage inside the body.

2. In an airplane and the like, a body, an undercarriage having axles, wheels mounted thereon, and folding means including a jointed strut with an offset hinge to retract the undercarriage inside the body.

3. In an airplane and the like, a body, an undercarriage having a jointed strut, a relatively short angular axle pivoted thereon, and connected to the body by two braces, a wheel mounted on the axle and means to retract the undercarriage into the body.

4. In an airplane and the like, a body, an undercarriage having a jointed strut, a relatively short angular axle pivoted thereon, support members pivotally connecting separate points on the axle to the body, a wheel mounted on the axle, and means to retract the undercarriage into the body.

5. In an airplane and the like, a body, an undercarriage having a hinged strut capable of folding inwardly pivotally connected to the body, a relatively short angular axle pivotally attached to the strut, a wheel mounted on the axle, separate supporting members pivoted to the axle and the body and means to retract the undercarriage into the body.

6. In an airplane and the like, a body, an undercarriage having an angular axle supported at two vertically separated pivotal points thereon by members pivoted upon the body, a wheel mounted on said axle and means to retract the undercarriage into the body.

7. In an airplane and the like, a body, an undercarriage having a jointed strut, an offset hinge on the joint of the strut to permit a limited folding movement, an axle connected to the lower end of the strut, a wheel mounted on the axle, a recess in the body, brace members pivotally connected to substantially separated points on the axle and to the body adapted to guide the wheel into the recess, and means controllable by the operator to fold the strut and retract the undercarriage into the body.

8. In an airplane and the like, a body having a retractable undercarriage comprising a sectional strut having an offset hinge to permit inward folding and adapted to resist folding under load, a short angular axle having a substantially vertical member connected to said strut and a spindle member, a wheel on the spindle member, slightly divergent support members connecting separate points on the vertical member of the axle to separate points on the body, a sheave on the upper end of the strut pivotally connected to the body, and means controllable by the operator to rotate said sheave to retract said undercarriage into the body.

9. In an airplane a body having recesses in the walls thereof, a wheeled undercarriage attached to the body, and means including a jointed compression member having an offset hinge to fold the undercarriage into the body and move the wheels into said recesses substantially in alignment with the walls of the body.

10. In an airplane and the like, a body having openings in the walls thereof, a wheeled undercarriage attached to the body, and means including a jointed compression member for folding the undercarriage inside the body and causing the wheels to substantially close said openings.

11. In an airplane and the like, a body having openings in the walls thereof, a wheeled undercarriage attached thereto, and means, including a jointed strut, to withdraw the undercarriage into the body thereby causing the wheels substantially to close said openings and to come into alignment with the body walls.

12. In an airplane and the like, a body having openings in the side walls thereof, a wheeled undercarriage attached to the body by a jointed strut, means within the airplane controllable by the operator to act upon the upper joint of said strut to foldingly retract said undercarriage through said openings and bring the wheels into substantial alignment with the body walls.

13. In an airplane and the like a body, an undercarriage having a jointed strut capable of folding inwardly in hinged relationship to the body, a relatively short angular axle connected to said strut, a wheel mounted on said axle, supporting members connected at one end to the axle and at the other end to the body, and means to retract the undercarriage into the body.

14. In an airplane and the like, a body having a retractible undercarriage comprising a jointed strut having an offset hinge adapted to fold inwardly, a short angular axle with a wheel mounted thereon connected to the strut, support members joining the axle directly to the body, and means to collapse the strut to withdraw the undercarriage into the body.

15. In combination an airplane body having an opening in the wall thereof, a collapsible undercarriage having a jointed compression member in hinged relationship to the body, a wheel mounted on the undercarriage, and means in the body to withdraw the undercarriage through said openings, said wheel forming a closure for the opening.

16. In combination an airplane body having openings in its walls, an undercarriage having a jointed compression member, wheels on said undercarriage and flexible means in the body to draw the undercarriage into the body through the openings, said wheel forming closures for said openings.

17. In combination with an airplane a retractable undercarriage having a sectional compression member adapted to lock itself against collapse when under load, an angular axle having a wheel mounted thereon attached to said member and means to collapse the undercarriage and maintain the wheel in a substantially vertical position.

18. In an airplane, a body, an undercarriage having a relatively short axle, a wheel mounted thereon, support members linking said axle to the body, a sectional strut having its lower section attached to said axle and having its upper section hinged to the body and means at the hinge acting upon the upper section to cause the strut to fold inwardly to retract the undercarriage.

19. In an airplane, a body, an undercarriage having wheels separately mounted on relatively short angular axles connected at separate points thereon by supporting and guiding members pivoted to the body, inwardly folding jointed struts pivotally connected to the body and to the axles, and means acting upon the struts at the place of connection to the body to retract the undercarriage.

20. An airplane body in combination with a retractable chassis comprising a Y shaped compression member having an offset hinge in the stem of the Y, a relatively short angular axle with a wheel mounted thereon attached to the strut, supporting and guiding members connecting vertically separate points on the axle to the airplane body, and means on an arm of the Y to retract the chassis into the body.

21. In an airplane, a body, an undercarriage having its wheels mounted on individual axles, a jointed strut pivotally connected to the body at its upper end and to an axle at its lower end, supporting members pivotally connected with the axle and the body, and means at the upper end of the strut to cause it to fold upwardly and inwardly to retract the undercarriage.

22. In an airplane and the like, a body, an undercarriage having a jointed strut connected to a relatively short axle, a wheel mounted thereon, members pivotally connecting the axle to the body, and means including a rotatable member attached to the upper end of the jointed strut and actuated by a flexible member to fold the undercarriage into the body.

23. In an airplane and the like, a body, an undercarriage having a relatively short axle, a wheel mounted thereon, support members pivoted to the axle and the body, a jointed strut connecting the axle to the body actuated by a flexible member to fold inwardly, a recess in the body, and means to retract the undercarriage into the recess.

24. In an airplane and the like, a body having a recess in the side thereof, a collapsible wheeled undercarriage therefor having a jointed compression member between each wheel and the body, and means associated with the jointed compression member and acting thereon to withdraw the undercarriage into the recess.

25. In an airplane and the like, a body having a recess in the side thereof, a collapsible wheeled undercarriage therefor having a jointed compression member between each wheel and the body, and means associated with the jointed compression member and acting upon the upper joint thereof to withdraw the undercarriage into the recess.

26. In an airplane and the like, a body having a recess in the side thereof, a collapsible wheeled undercarriage therefor having a jointed compression member between each wheel and the body, and means associated with the upper joint of the compression member and acting thereon to withdraw the undercarriage into the recess.

LEROY R. GRUMMAN.